(12) United States Patent
Wang et al.

(10) Patent No.: US 6,838,303 B2
(45) Date of Patent: Jan. 4, 2005

(54) SILICON PRESSURE SENSOR AND THE MANUFACTURING METHOD THEREOF

(75) Inventors: Hung-Dar Wang, Kaohsiung (TW); Shih-Chin Gong, Taipei (TW)

(73) Assignee: Asia Pacific Microsystems, Inc., Hsinchu (TW)

( * ) Notice: Subject to any disclaimer, the term of this patent is extended or adjusted under 35 U.S.C. 154(b) by 0 days.

(21) Appl. No.: 10/390,628

(22) Filed: Mar. 19, 2003

(65) Prior Publication Data

US 2004/0183150 A1 Sep. 23, 2004

(51) Int. Cl.$^7$ .............................................. H01L 21/00
(52) U.S. Cl. ........................................ 438/50; 438/54
(58) Field of Search .............................. 438/50, 51, 52, 438/53, 54, 55; 257/417, 418, 419; 73/726, 727

(56) References Cited

U.S. PATENT DOCUMENTS

| | | | | |
|---|---|---|---|---|
| 4,467,656 A | * | 8/1984 | Mallon et al. | 73/727 |
| 4,672,411 A | * | 6/1987 | Shimizu et al. | 257/419 |
| 5,170,237 A | * | 12/1992 | Tsuda et al. | 257/419 |
| 5,714,690 A | * | 2/1998 | Burns et al. | 438/456 |
| 5,812,047 A | * | 9/1998 | van Kampen | 257/419 |
| 5,872,315 A | * | 2/1999 | Nagase et al. | 73/726 |
| 6,204,086 B1 | * | 3/2001 | Muchow et al. | 438/53 |
| 6,523,415 B2 | * | 2/2003 | Kurtz et al. | 29/25.35 |

* cited by examiner

Primary Examiner—Kevin M. Picardat
(74) Attorney, Agent, or Firm—Troxell Law Office, PLLC

(57) ABSTRACT

The present invention relates to a silicon pressure sensor that in need of three strips of piezoresistors on each side and the manufacturing method thereof; wherein, the impurity concentration of the piezoresistors are about $10^{19-10^{20}}$ $cm^{-3}$ in order to reduce the influence of temperature; the lead between the piezoresistors (namely the internal connection lead) is a highly-doping interconnect (about $10^{21}$ $cm^{-3}$) fabricated along the direction with minimum piezoresistance coefficient; with regard to the connection circuit for connecting the piezoresistors with the external Wheatstone bridge circuit (namely the external connection circuit), of which one end near the inner side of the membrane is also fabricated along the direction with minimum piezoresistance coefficient, and another end of the lead near the edge of the membrane is a interconnect that is perpendicular to the diaphragm, and is connected out to the external circuit; with this structure, the four resistors of the Whetstone bridge are balanced and symmetrized, thus the zero offset caused by the variations in resistance of the bridge can be reduced in order to simplify the signal-processing circuit.

7 Claims, 6 Drawing Sheets

SILICON PRESSURE SENSOR AND THE MANUFACTURING METHOD THEREOF

BACKGROUND OF THE INVENTION

1. Field of the Invention

The present invention relates to a silicon pressure sensor and the manufacturing method thereof, which is enabled with the low-temperature drift and the directionality for forming a layout on a membrane by the silicon-piezoresistor and interconnects. Thus, a maximum pressure-sensing signal can be obtained, and it is correspondent with the simplicity to balance the Wheatstone bridge circuit.

2. Description of the Related Background

The piezoresistive pressure sensor device is one of the pressure-sensing devices for the semiconductors, and the principle thereof is to sense the pressure from the outward environment by means of the piezoresistance effect of the silicon. In 1954, the piezoresistance effect is found by C. S. Smith [1]. A conventional approach has been to arrange four resistors in a Wheatstone bridge configuration. Small changes in the individual resistance values contribute to a significant offset in the bridge and provide an easily detectible signal.

Classical strain gages are made of fine metal wire for sensing the stress. The gage factor of semiconductors is more than an order of magnitude higher than that of metal. Good matching of the resistors can be achieved, which is particularly useful if Wheatstone bridges are used. The technique is very suitable for miniaturization of the sensors. It is able to integrate other circuit directly on the same wafer, for signal amplification and temperature compensation. The piezoresistive pressure sensor has some of the practical advantages.

Piezoresistors are fabricated onto a membrane made of single crystal silicon, and they are connected altogether to form a Wheatstone bridge. Since the silicon piezoresistors are having varied crystal orientation, variations of the piezoresistance coefficient would be generated, so that the performance of the device would be affected by the location and the orientation of the silicon piezoresistors on the Wheatstone bridge. As the circuit of the Wheatstone bridge is not balanced, the offset would not be approached to zero. The magnitude of the output signal would be affected by the impurity concentration and the temperature. The above-mentioned factors would increase the difficulties in forming the compensation circuit.

A membrane is fabricated by etching away the bulk silicon on a defined region until the required thickness is reached. Piezoresistors are integrated on the membrane, typically close to the edges. As the deformation and the stress are generated on the membrane by the stress, the resistance value would be varied by the silicon piezoresistor on the surface of the membrane, then the output voltage thereof can be magnified after sensed by the Wheatstone bridge. Wherein, as described above and shown in FIG. 1 (please refer to the reference material [2]), the piezoresistive coefficients would be changed according to the crystal orientation, so the efficiency of the device would be affected by the location and orientation factors of the silicon piezoresistors on the Wheatstone bridge. In addition, since the thermal expansion coefficient of the metal aluminum layer is different to that of the silicon nitride layer, the residual stresses would be generated during the process, and the suspended diaphragm so that the linearity for pressure sensing would be affected. Therefore, the interconnection of diaphragm region is mainly the interconnect with high doped concentration and low resistance.

As shown in FIG. 1, on a (100) silicon substrate, a maximum piezoresistance coefficient can be obtained by fabricating the silicon in the [110] direction, and a minimum piezoresistance coefficient can be obtained by fabricating the silicon piezoresistors in a direction set [100]. With respect to the present invention according to such relationships, the piezoresistors with high resistance are fabricated on the silicon suspended diaphragm towards the direction set [110] so that a maximum value of the resistance variation can be obtained; the interconnect with low resistance for connecting the piezoresistors on the diaphragm are fabricated towards the direction set [100] in order to reduce the influence upon the interconnect caused by the stresses. The resistance of the Wheatstone bridge is mainly contributed by the piezoresistors on the set of direction set [110], thus the linearity of the pressure-sensing device can be enhanced. The balance between the four resistors on the Wheatstone bridge is also an important consideration since the mismatch between the resistance value would cause the offset of the output voltage. In addition, the influence of the temperature can be reduced by designing the piezoresistance impurity concentration between $10^{19-1020}$ cm$^{-3}$. Based on the above-mentioned design principle, the linearity of the output signals can be better, and the influence of temperature can be decreased.

3. Description of the Prior Art

There are some fabrication methods for the piezoresistive pressure sensor disclosed previously, and the brief descriptions are as below:

(1) In the U.S. Pat. No. 4,672,411 disclosed by Shimizu et al., a couple of p-type piezoresistors along the direction <110> are fabricated onto the membrane made of n type (100) silicon. Wherein a p+ type interconnect, which is highly doped and along the direction set [100], is a connection between the couple of the piezoresistors. Similarly, a p+ type interconnect, which is highly doped and along the direction set [100], is also fabricated to the another two ends of the two piezoresistors for connecting themselves with the metal interconnect out of the membrane. Please refer to FIG. 2 and the reference material [3] for details.

(2) In another investigation disclosed by S.-C. Kim et al. [4], a pressure sensor is fabricated onto a square membrane made of n type silicon, wherein a piezoresistor 320 with a strip is fabricated to each of the two opposite sides of the diaphragm, and a piezoresistor with two strips is fabricated to each of another two opposite sides, then the four resistors are connected by a metal interconnect 330 and a Wheatstone bridge is formed. Please refer to FIG. 3 and the reference material [4]. During the fabrication process, as the piezoresistors, which is parallel to the diaphragm, is getting nearer to the edge of the diaphragm, the larger stresses would be generated, so the piezoresistor with a single strip is applied in order to obtain a higher output signal. With respect to the piezoresistors of the vertical to diaphragm, as the piezoresistor is getting longer, the average stresses would be smaller. In order to maintain the symmetry and the balance of the Wheatstone bridge, the piezoresistor 320 is fabricated into two strips, and a higher resistance and output signal can be obtained.

In addition, the piezoresistance coefficient can be expressed by its room-temperature value, referred to as π

(300K), multiplied by a dimensionless factor that is a function of doping concentration (N) and temperature (T) (please refer to the reference material [5]):

π(N,T)=P(N,T) π(300K)

π(N,T): piezoresistance coefficient
P(N,T): piezoresistance factor
π(300K.): the piezoresistance coefficient under the room temperature (T=300K)

In the reference material [5], FIG. 4 shows the piezoresistance factor as a function of impurity concentration and temperature. The piezoresistance factor decrease with increasing impurity concentration. As the impurity concentration larger than $10^{19}$ cm$^{-3}$ is selected for fabrication, an advantage that the piezoresistor is less influenced by the temperature is generated. Also, as to the consideration of lowering the fabrication cost of the devices, there is a tendency to reduce the size of the pressure sensor, so the dimension of the piezoresistors becomes longer relative to the sensing device and the linearity of the device and the magnitude of the output signals would be influenced, therefore, it must to reduced the length of the piezoresistors. Further, in order to decrease the low temperature effect, a highly impurity concentration is applied, thus the resistance value of the piezoresistor is reduced. In conclusion, as the length of the piezoresistor and the resistance of the piezoresistor diaphragm are becoming smaller, more strip piezoresistors should be applied in order to maintain a required resistance, thus it is enable to correspond with the electric specifications and applications.

SUMMARY OF THE INVENTION

In accordance with the disadvantages of the conventional piezoresistant pressure sensor mentioned above, the present invention is to provide a new piezoresistive pressure sensor with regard to three strips of piezoresistors. While the three strips of piezoresistors with lower impurity concentration (about $10^{19-1020}$ cm$^{-3}$) are being manufactured, the interconnect with higher impurity concentration (about $10^{21}$ cm$^{-3}$) are fabricated between the piezoresistors along the direction with the minimum piezoresistance coefficient. The external connection circuit, which connects the piezoresistors with the external Wheatstone bridge circuit, of which the side near the inner side of the diaphragm is also fabricated along the direction with the minimum piezoresistance coefficient, and the interconnect near the edge of the diaphragm is a perpendicular lead to the diaphragm for connecting to the external circuit. Thus, the four resistors of the Wheatstone bridge can be balanced and a better linearity thereof is accomplished, and therefore, the offset of the pressure sensor thereof can be lowered in order to simplify the circuit design for the follow-up signaling processes.

Therefore, it is an object of the present invention to provide a piezoresistive pressure sensor, which is less influenced by the temperature and in need of three piezoresistors on every sides. On the n type substrate, wherein the piezoresistors are made of low-doping p type silicon along the direction with the maximum piezoresistance coefficient, and the internal and external connection circuits are made of high-doping p type silicon along the direction with the minimum piezoresistance coefficient. In addition, since the piezoresistor are located on the centers of the edges of the membrane, in order to get high linearity, the external interconnect leads on the membrane edges is connected out along the direction that is perpendicular to the membrane (the direction set [110]) and are connected with the external metal interconnect; and the external interconnect inside the membrane is located along the direction set [010].

DETAILED DESCRIPTION OF THE PREFERRED EMBODIMENT

An embodiment of the present invention will now be explained in detail with reference to the accompanying drawings. Here, in this example, the structure is based on a silicon substrate and is fabricated by using the semiconductor process. Considering with the low temperature drift and the high linearity, in order to obtain a higher output signal, the piezoresistors and interconnects are fabricated onto the membrane with appropriate orientation and location.

Nevertheless, it is unnecessary to comply with the described processes completely for practical fabrication of the devices. It is clear that many other variations would be possible without departing from the basic approach, demonstrated in the present invention. The steps below, for example, of which the sequences for fabricating the piezoresistors and the interconnects can be changed in order to obtain a similar structure with the same functions.

EXAMPLE 1

Figure 1:
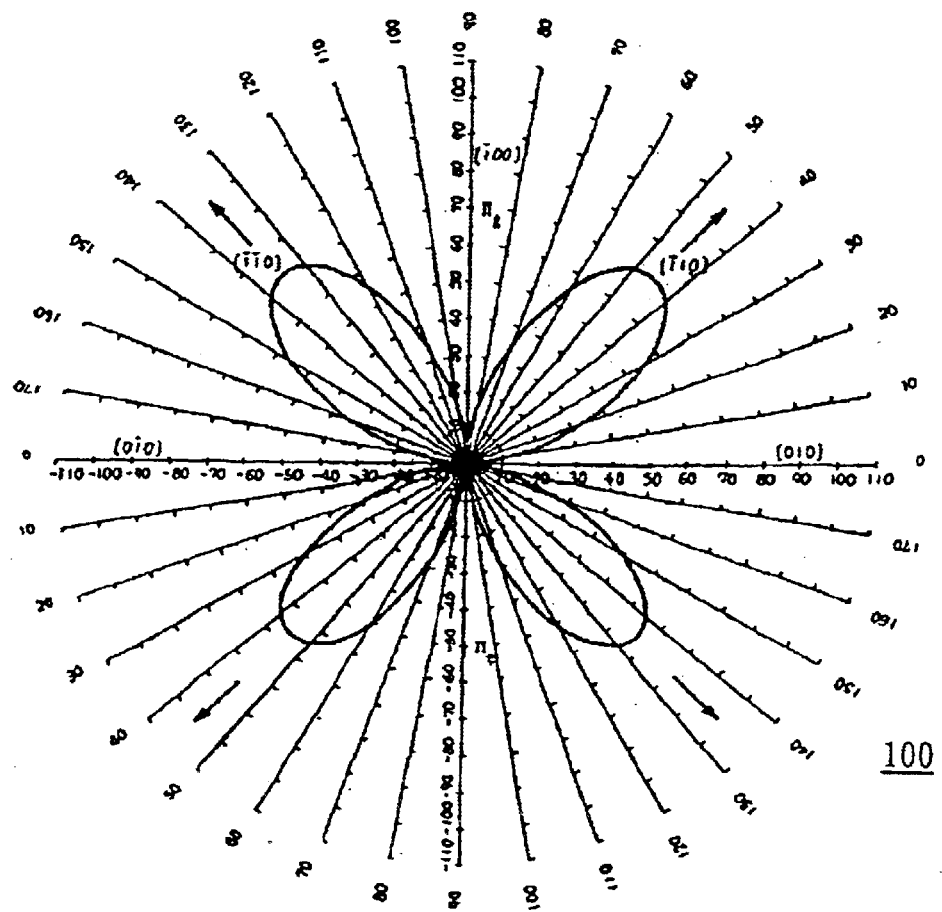
FIG. 1 shows the relationship between the crystal orientation of a (100) silicon substrate and the piezoresistance coefficient.
Figure 2:
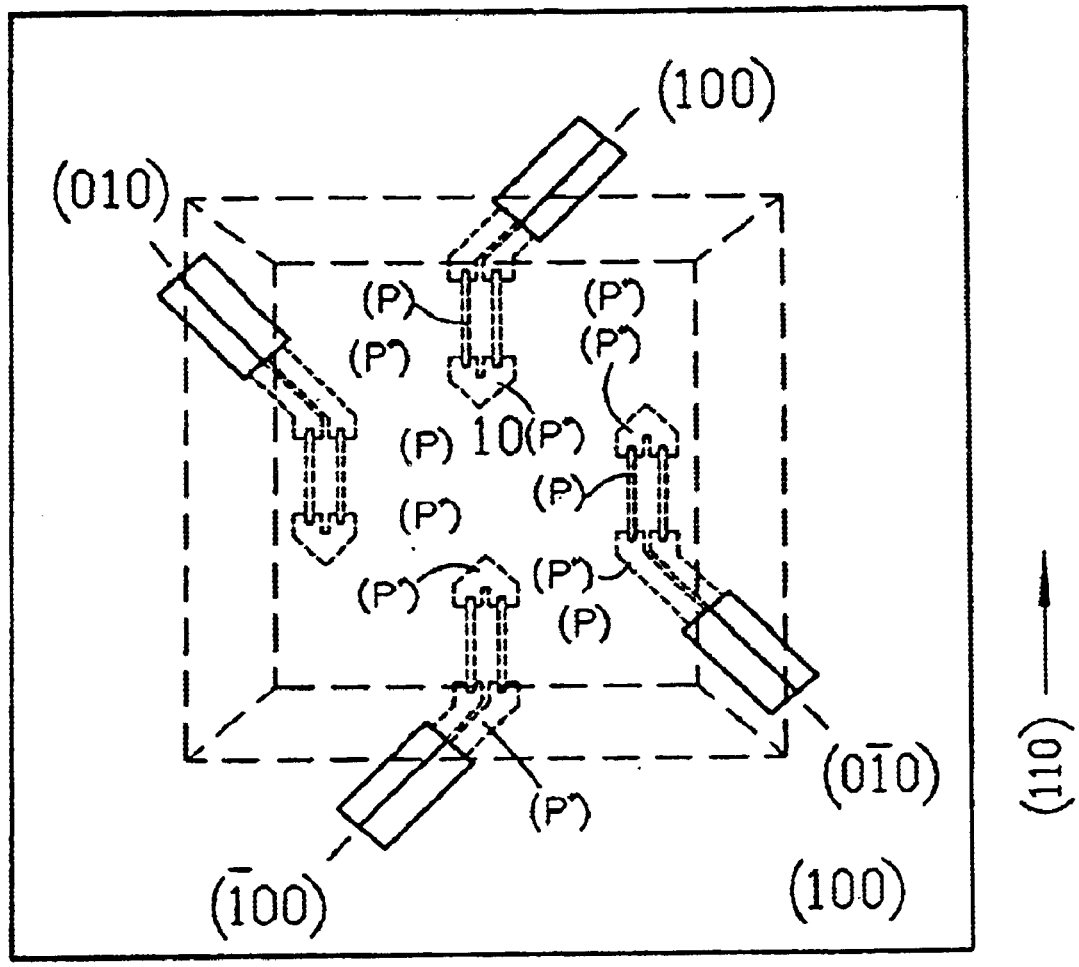
FIG. 2 is a perspective view showing the pressure sensor disclosed by Isao Shimizu.
Figure 3:
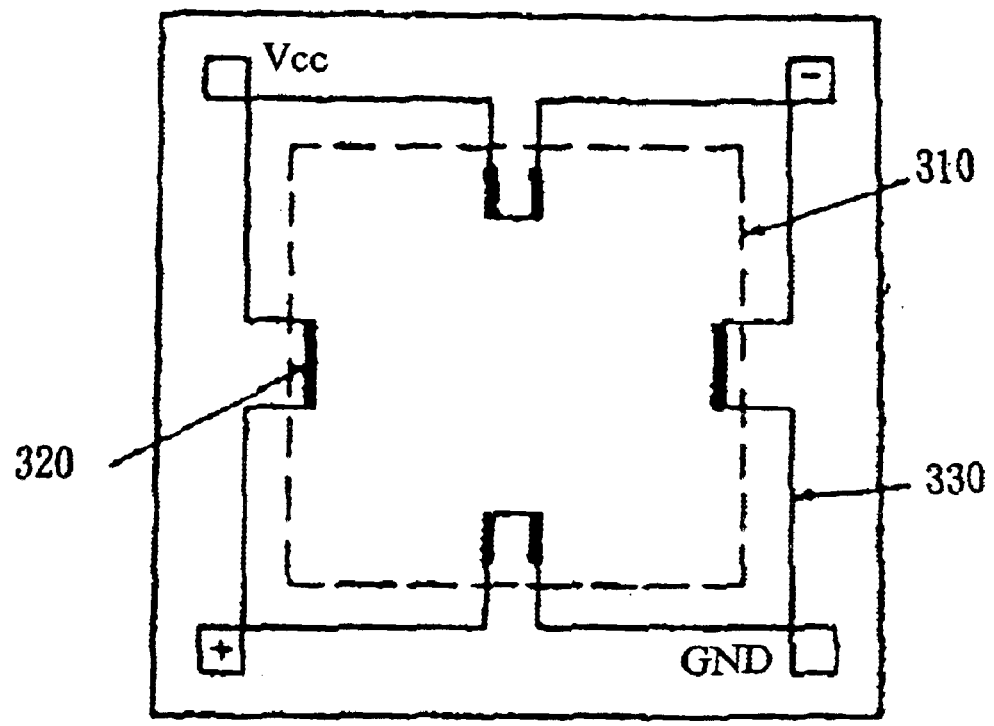
FIG. 3 is a perspective view showing the pressure sensor disclosed by Sea-Chung Kim.
Figure 4:
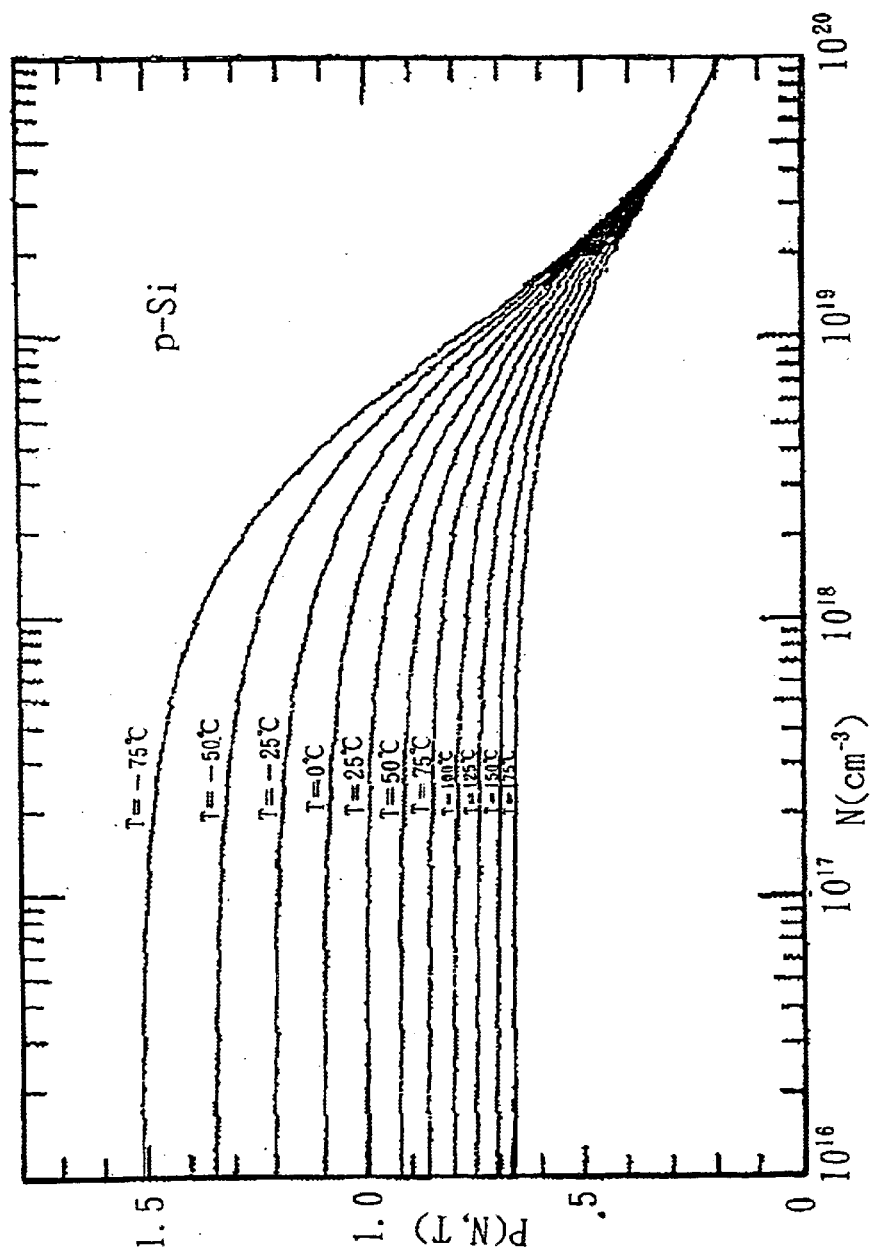
FIG. 4 shows the relationships between the piezoresistance factor P(N,T), the impurity concentration N and the temperature T of the p type silicon.
Figure 5:
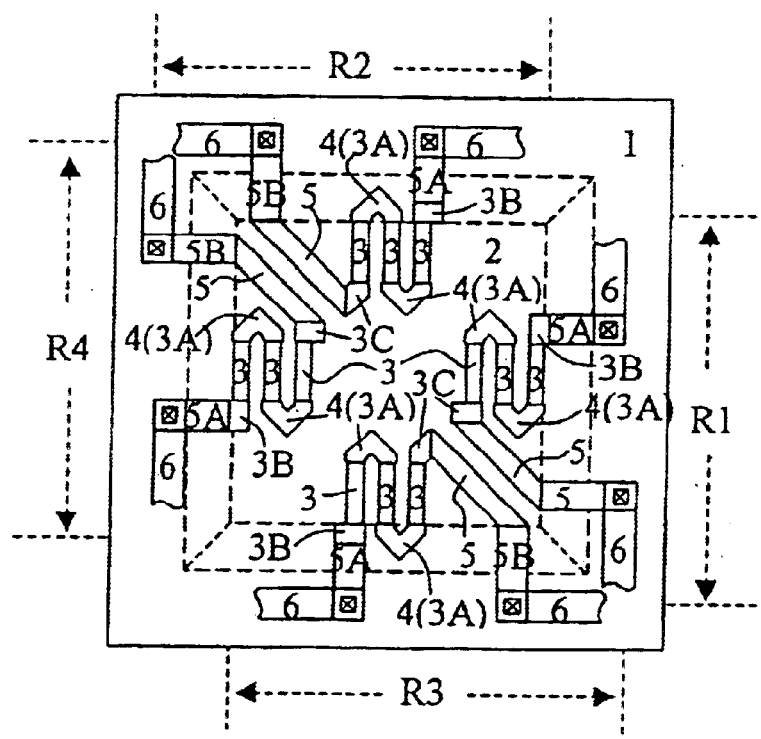
FIG. 5 shows the pressure sensor according to the present invention, wherein the dotted-line part indicates the membrane.
Figure 6:
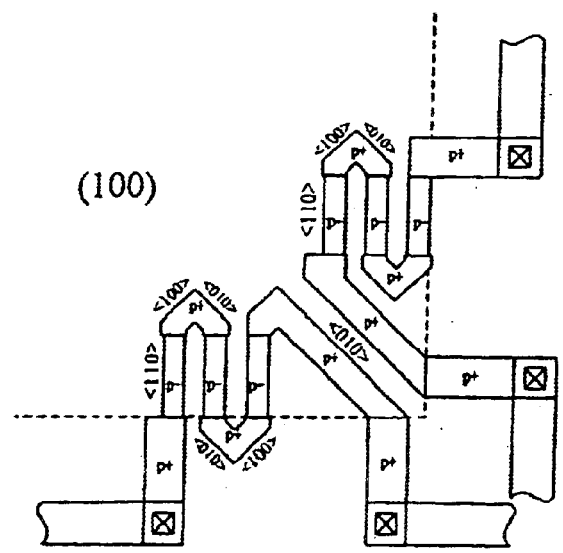
FIG. 6 is a partially magnified perspective view showing the pressure sensor according to the present invention, wherein the impurity concentration and the orientation thereof is shown.

FIG. 5 is a perspective view showing the pressure sensor according to the present invention, wherein the dotted-line area 2 indicates the membrane made of n type single crystal silicon (100) by using the bulk micromachining process. FIG. 6 is a partially magnified view from FIG. 5, and the impurity concentration and the orientation thereof are shown. Firstly, on the frontage of the p type substrate with n type epitaxial layer, piezoresistors 3 are defined along the direction <110>. The piezoresistors 3A lapping over the internal interconnects, the piezoresistors 3B, and the piezoresistors 3C lapping over the external interconnects are ion-implanted by low-doping p type silicon, thus continuous piezoresistance areas with high resistance can be formed respectively.

Then, the internal and external interconnects are defined. First, the internal interconnect 4 are defined along the directions <100> and <010> (lapping over the piezoresistors 3A), and the external interconnect 5 are defined along the direction <010> (lapping over the piezoresistors 3C); the external interconnect 5A are defined to be perpendicular to the diaphragm (lapping over the piezoresistors 3B), and the external interconnect 5B are defined to be perpendicular to the membrane. These internal and external interconnects are processed with high impurity concentration, thus a interconnect with low resistance is accomplished.

Figure 7:
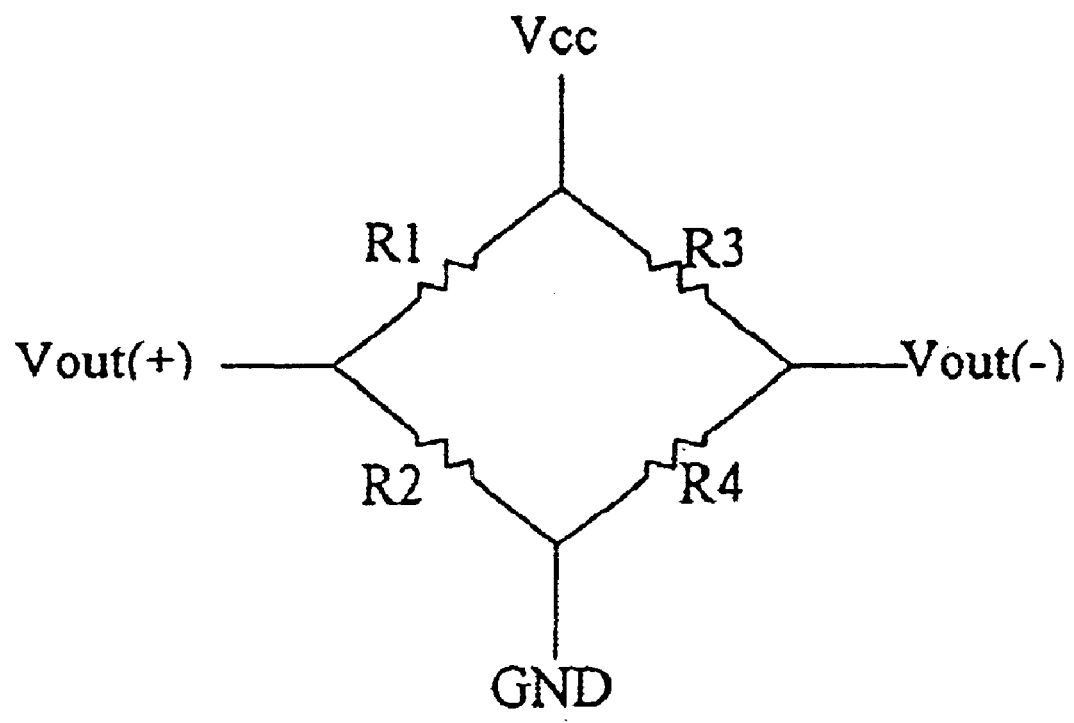
FIG. 7 shows the Wheatstone bridge corresponding to the bridge resistors shown in FIG. 5.

Afterwards, the external interconnect 5A are connected with the aluminum metal interconnects in order to form a Wheatstone bridge as shown in FIG. 7. The four resistors are balanced by positioning particularly symmetrically, and the offset will approach to minimum.

Finally, an etching window is opened on the backside of the substrate and the membrane is form by using the electrochemical etch-stop technique, wherein potassium hydroxide (KOH) is used as an etchant. The p type substrate is etched from the backside thereof. Thus, a membrane which is made of n type epitaxial silicon layer with a remaining area 2 for sensing the variations of pressure, is accomplished.

Reference Materials

1 C. S. Smith, "Piezoresistance effect in germanium and silicon", Physical Review, 94,42–49 (1954).
2 O. N. Tufte and E. L. Steizer, "Piezoresistive properties of silicon diffused layers", J. Appl. Phys. 34. 313–18 (1963).
3 I. Shimizu and J. Hoya, "Pressure sensor device", U.S. Pat. No. 4,672,411 (1987).
4 S.-C. Kim and K. D. Wise, "Temperature sensitivity in silicon piezoresistive pressure transducers", IEEE Transactions on Electron Devices, Vol. ED-30, No.7, pp.802–810, 1983.
5 Y. Kanda, "A Graphical Representation of the Piezoresistance Coefficients in Silicon", IEEE Transactions on Electron Devices, Vol. ED-29, No. 1, pp.64–70,1982.

What is claimed is:

1. A method of manufacturing a semiconductor pressure sensor which comprises the steps of
   (a) providing a silicon substrate including an upper surface of n type silicon;
   (b) inside a square area on the upper surface of the silicon substrate, forming a piezoresistor combination having three strips of piezoresistors on each side thereon;
   (c) on the upper surface of the silicon substrate, forming an internal connection connecting the three strips of piezoresistors with each other;
   (d) on the upper surface of the silicon substrate, forming an external connection lead connecting the three strips of piezoresistors to a metal packaging lead, such that signals are transmitted from the three strips of piezoresistors through the external connection lead to the metal packaging lead.

2. The method according to claim 1, wherein the silicon surface is (100) orientation plane.

3. The method according to claim 1, wherein the three strips of piezoresistors are oriented parallel to <110> crystalline direction.

4. The method according to claim 1, wherein the internal connection leads are intersected leads directing along the directions <100> and <010>.

5. The method according to claim 1, wherein the external connection leads are divided into two parts; one part is passing through the three strips of piezoresistors connected with the internal connection lead, and it is connected out from the end point near the inner side of the square membrane to the external metal lead; the lead is along to the directions <100> or <010>, and is used for connecting the signals out to the external connection lead.

6. The method according to claim 5, wherein the external connection lead, passes through the three strips of piezoresistors connected with the internal connection lead, and it is connected to the external connection lead at an end point adjacent to an edge of the square area; the external connection lead is directed perpendicularly to the edge of the square area and is used for transmitting the signals.

7. The method according to claim 1, wherein the said piezoresistor is a p type silicon area with high resistance formed by using one of an ion-implantation method and an ion-diffusion method; the internal and external connection leads are a p type silicon area with low resistance formed by using one of the ion-implantation method and the ion-diffusion method.

* * * * *